United States Patent Office 2,888,450
Patented May 26, 1959

2,888,450
WATER INSOLUBLE MONOAZO DYESTUFFS

Winfried Kruckenberg, Leverkusen-Bayerwerk, Germany, assignor to Farbenfabriken Bayer Aktiengesellschaft, Leverkusen, Germany, a corporation of Germany No Drawing. Application October 25, 1955
Serial No. 542,762

Claims priority, application Germany November 20, 1954

7 Claims. (Cl. 260—155)

The present invention relates to new water insoluble monoazo dyestuffs and a process of making the same; more particularly, it relates to monoazo dyestuffs corresponding to the formula:

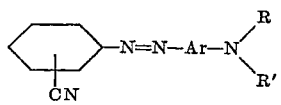

wherein Ar means an aromatic radical of the benzene or naphthalene series, R stands for hydrogen, alkyl, hydroxy alkyl or acylated hydroxy alkyl, the hydroxy alkyl may be attached to Ar with ring-formation, and R' stands for hydrogen or an acyl radical, the azo bridge and the

group standing in Ar in p-position to each other, and wherein the benzene nucleus, bearing the CN-group, is further substituted by alkyl and/or halogen and/or cyano.

It is an object of the present invention to provide a new process for the manufacture of water insoluble monoazo dyestuffs.

It is a further object of the present invention to provide new water insoluble azo dyestuffs of good fastness properties.

In my copending application Ser. No. 432,313, filed May 5, 1954, water insoluble monoazo dyestuffs are described which can be obtained by coupling diazotized cyano anilines which are further substituted in the benzene nucleus by alkyl and/or halogen and/or cyano with aromatic amines of the benzene series being capable of coupling in p-position to the amino group, one of the hydrogen atoms of the amino group being replaced by a hydroxy alkyl group and the other hydrogen atom by an alkyl or hydroxy alkyl group and the diazo and coupling components being free from carboxylic and sulfonic acid groups.

In accordance with the present invention I have now found that valuable water insoluble monoazo dyestuffs are obtainable by coupling diazotized cyano anilines which are further substituted in the benzene nucleus by alkyl and/or halogen and/or cyano with aromatic amines of the benzene or naphthalenes series being capable of coupling in p-position to the amino group, wherein one of the hydrogen atoms of the amino group may be replaced by alkyl or hydroxy alkyl; and the hydroxy alkyl may be attached to the nucleus carbon atom in o-position with ring-formation. The components, e.g. diazo and coupling components, are free from sulfonic and carboxylic acid groups. The coupling components are those frequently used in the manufacture of water insoluble azo dyestuffs particularly suited for dyeing cellulose acetate fibres.

The dyestuffs thus obtained may be subsequently acylated; if a N-hydroxy alkyl group is present in the coupling component, it can be esterified too.

The new water insoluble monoazo dyestuffs yield clear orange to blue dyeings of good fastness to light and washing on polyamide and cellulose acetate fibres. The new dyestuffs are distinguished by the property to yield equal or almost equal shades of particular clearness and of equal or almost equal fastness to light on both types of fibres. By this quality they excel the known comparable water insoluble monoazo dyestuffs which are substituted in the diazo component by a nitro group.

The present invention is illustrated by the following examples however, without being restricted thereto; the parts being by weight:

Example 1

15.3 parts of 1-amino-2-cyano-5-chlorobenzene are dissolved in 50 cc. of concentrated hydrochloric acid, upon which 35 parts of a 20 percent sodium nitrite solution are run in with good stirring and cooling. After diazotization is complete, the solution is filtered, partly neutralized (Congo-red paper shall show a violet stain) with dilute caustic soda solution and combined with a solution of 15.1 parts of 1-N-hydroxyethylamino-3-methylbenzene in dilute hydrochloric acid. Coupling is made complete by adding sodium acetate, whereby the azo dyestuff separates as a red powder. The dyestuff is filtered off and washed neutral. When dry, it forms a light red powder which dissolves in organic solvents with an orange color. The dyestuff corresponds to the formula:

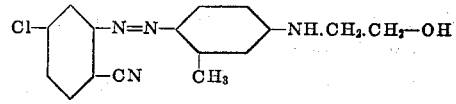

and dyes, after being finely dispersed by means of suitable agents, acetate rayon and polyamide fibres clear orange shades.

Example 2

The light red powder of the dyestuff obtained as described in Example 1 is heated to the boil in excess acetic anhydride for about 30 minutes; then the mixture of acetic acid and anhydride is distilled off in vacuum as much as possible, the residue is finely ground with water, filtered with suction and dried. The light red dyestuff thus obtained corresponds to the formula:

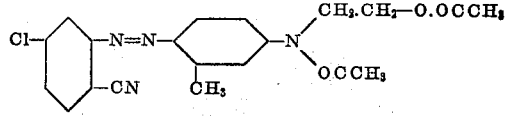

It dyes, after being finely dispersed by means of suitable agents, acetate rayon and polyamide fibres in clear orange shades.

Example 3

15.3 parts of 1-amino-3-chloro-4-cyanobenzene are diazotized with 50 parts of concentrated hydrochloric acid and 35 parts of a 20 percent sodium nitrite solution and coupled with 12.8 parts of 1-amino-2,5-dimethylbenzene in the manner described in Example 1. The dyestuff obtained corresponds to the formula:

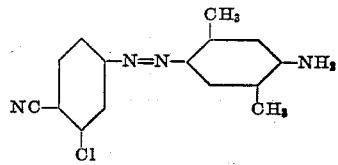

It dyes, after being finely dispersed by means of suited agents, acetate rayon and polyamide fibres in clear orange shades.

Example 4

15.3 parts of 1-amino-2-cyano-5-chlorobenzene are diazotized as described in Example 1. The diazo salt solution is added to an aqueous solution of 25.2 parts of py-tetrahydro-3,6'-dihydroxy-7,8,1',2'-benzoquinoline. The coupling starts instantaneously with the precipitation of the monoazo dyestuff formed and is rapidly completed by addition of sodium acetate. The dyestuff formed, corresponding to the formula:

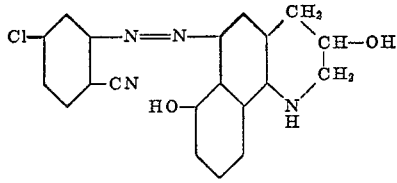

is filtered with suction and dried. It represents a black powder which dyes acetate rayon and polyamide fibres in clear reddish-blue shades.

Example 5

14.3 parts of 1-amino-2,4-dicyano-benzene are dissolved in 460 parts of concentrated sulfonic acid at 0–15° C. and diazotized with 170 parts of nitrosylsulfuric acid (42 parts of nitrite in 100 cc.) with good stirring and cooling. After about 3 hours the mixture is added to 3000 parts of ice, a slight excess of nitrite removed by adding amidosulfonic acid and the solution is filtered. The solution thus obtained is combined with a solution of 15.1 parts of 1-N-hydroxyethylamino-3-methylbenzene, the mixture is partly neutralized (Congo red paper shall show violet stain) with dilute caustic soda and coupling is completed by adding sodium acetate. The dyestuff obtained corresponding to the formula:

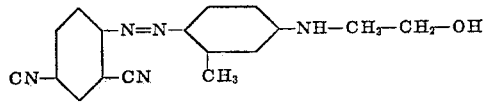

is filtered and washed. After drying, it represents a black-red powder which dissolves in organic solvents such as acetone or alcohol with a red color. After being finely dispersed by means of suitable agents, it dyes acetate rayon and polyamide fibres in clear bluish-red shades.

Example 6

A dyestuff is obtained by the manner described in Example 5 from 15.7 parts diazotized 1-amino-2-methyl-4,6-dicyanobenzene and 15.1 parts of 1-N-hydroxy-ethyl-3-methylbenzene. The dry black-red powder is heated to the boil with an excess of acetic anhydride for about 30 minutes. Then the mixture of acetic acid and acetic anhydride is distilled off as much as possible in vacuum. The residue is finely ground with water, filtered with suction and dried. The dyestuff obtained, corresponding to the following formula:

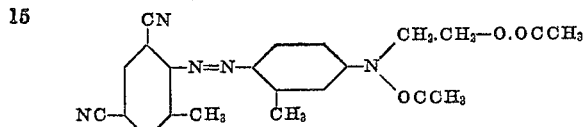

is a black red powder which dyes, after being finely dispersed by means of suitable agents, acetate rayon and polyamide fibres in clear bluish-red shades.

Example 7

14.3 parts of 1-amino-2,4-dicyano-benzene are diazotized as described in Example 5. The diazo salt solution is added to an aqueous solution of 25.2 parts of py-tetrahydro-3,6'-dihydroxy-7,8,1',2'-benzoquinoline. The mixture is partly neutralized (Congo red paper shall show a violet stain) with dilute caustic soda and coupling is complete by addition of sodium acetate. The dyestuff obtained corresponds to the formula:

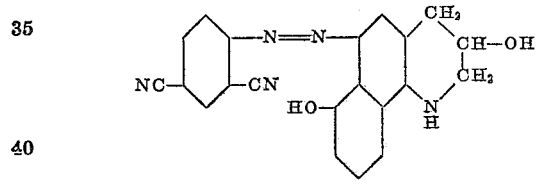

It represents a black powder which dyes acetate rayon and polyamide fibres in clear strongly greenish-blue shades.

| Diazo component | Azo component | Shade on— | |
|---|---|---|---|
| | | acetate rayon | polyamide fibre |
| 1-amino-3-chloro-4-cyano-benzene | 1-N-hydroxyethylamino-3-methylbenzene. | strongly reddish orange. | scarlet. |
| Do | 1-N-hydroxyethylamino-3-methylbenzene dyestuff subsequently acetylated. | do | strongly reddish orange. |
| Do | 1-amino-3-methylbenzene | yellowish orange | yellowish orange. |
| Do | 1-N-ethylamino-3-methylbenzene | orange | orange. |
| Do | 1-amino-2,5-dimethylbenzene | do | Do. |
| 1-amino-2-cyano-5-chlorobenzene | N-hydroxyethylaminobenzene | yellowish orange | yellowish orange. |
| Do | 1-N-hydroxyethylamino-3-methylbenzene. | strongly reddish orange. | strongly reddish orange. |
| Do | 1-N-butylamino-3 methylbenzene | orange | orange. |
| Do | 1-amino-2,5-dimethylbenzene | yellowish orange | yellowish orange. |
| Do | 1-N-hydroxyethylamino-3-methylbenzene dyestuff subsequently acetylated. | orange | orange. |
| Do | py-tetrahydro-3,6'-dihydroxy-7,8,1',2'-benzoquinoline. | reddish blue | reddish blue. |
| Do | 1-amino-6-hydroxynaphthalene | bluish red | bluish red. |
| Do | 1-amino-7-hydroxynaphthalene | do | bluish Bordeaux red. |
| Do | 1-amino-2-methyl-5-ethoxybenzene | orange | orange. |
| 1-amino-2-methyl-4,6-dicyanobenzene | py-tetrahydro-3,6'-dihydroxy-7,8,1',2'-benzoquinoline. | blue | greenish blue. |
| Do | 1-N-hydroxyethylamino-3-methylbenzene dyestuff subsequently acetylated. | red | bluish red. |
| Do | 1-N-ethylamino-3-methylbenzene | do | slightly bluish red. |
| Do | 1-N-hydroxyethylamino-3-methylbenzene. | bluish red | bluish red. |
| 1-amino-2,4-dicyanobenzene | 1-amino-2-ethoxynaphthalene | bluish violet | bluish violet. |
| Do | 1-N-hydroxyethylamino-3-methylbenzene. | bluish red | bluish red. |
| Do | py-tetrahydro-3,6'-dihydroxy-7,8,1',2'-benzoquinoline. | greenish blue | greenish blue. |
| 1-amino-2,4-dicyano-3,6-dimethylbenzene | 1-N-hydroxyethylamino-3-methylbenzene. | bluish red | Bordeaux-red. |

I claim:
1. Water insoluble monoazo dyestuffs corresponding to the formula

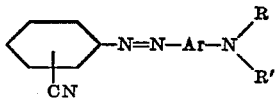

wherein Ar stands for an aromatic radical selected from the group consisting of the benzene and naphthalene series, said radical bearing the azo bridge and the group

in p-position to each other, R stands for a member selected from the group consisting of hydrogen, lower alkyl, hydroxy lower alkyl, lower alkylated hydroxy lower alkyl and hydroxy lower alkyl being attached to Ar in o-position to the

group, R' for a radical selected from the group consisting of hydrogen and lower alkoyl, and wherein the benzene nucleus, bearing the CN-group, is a member selected from the groups consisting of chlorocyanophenyl, dicyano-phenyl and lower alkyl-dicyano-phenyl, said dyestuffs being free from sulfonic and carboxylic acid groups.

2. Water insoluble monoazo dyestuffs corresponding to the following formula:

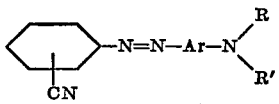

wherein Ar stands for an aromatic radical selected from the group consisting of the benzene and naphthalene series, said radical bearing the azo bridge and the

group in p-position to each other, R stands for a hydroxy lower alkyl group being attached to Ar in o-position to the

group, R' stands for a radical selected from the group consisting of hydrogen and lower alkoyl, and wherein the benzene nucleus, bearing the CN-group, is a member selected from the groups consisting of chlorocyanophenyl, dicyano-phenyl and lower alkyl-dicyano-phenyl, said dyestuffs being free from sulfonic and carboxylic acid groups.

3. Water insoluble monoazo dyestuffs corresponding to the formula:

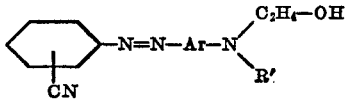

wherein Ar stands for an aromatic radical selected from the group consisting of the benzene and naphthalene series bearing the azo bridge and the

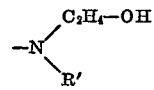

group in p-position to each other, and R' for a radical selected from the group consisting of hydrogen and lower alkoyl, and wherein the benzene nucleus, bearing the CN-group, is a member selected from the groups consisting of chlorocyanophenyl, dicyano-phenyl and lower alkyl-dicyano-phenyl, said dyestuffs being free from sulfonic and carboxylic acid groups.

4. Water insoluble monoazo dyestuffs corresponding to the formula:

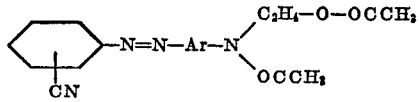

wherein Ar stands for an aromatic radical selected from the group consisting of the benzene and naphthalene series bearing the azo bridge and the

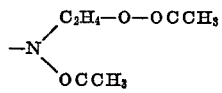

group in p-position to each other, and wherein the benzene nucleus, bearing the CN-group, is a member selected from the groups consisting of chlorocyanophenyl, dicyano-phenyl and lower alkyl-dicyano-phenyl, said dyestuffs being free from sulfonic and carboxylic acid groups.

5. The dyestuff corresponding to the formula:

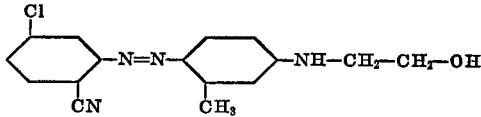

6. The dyestuff corresponding to the formula:

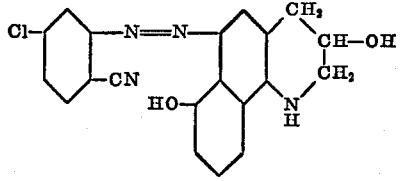

7. The dyestuff corresponding to the formula:

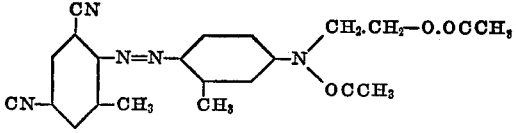

References Cited in the file of this patent
UNITED STATES PATENTS

| | | |
|---|---|---|
| 2,173,417 | Huber | Sept. 19, 1939 |
| 2,289,376 | McNally et al. | July 14, 1942 |
| 2,384,734 | Felix et al. | Sept. 10, 1945 |
| 2,387,987 | Felix et al. | Oct. 30, 1945 |